July 13, 1965   J. G. THIBODAUX, JR., ETAL   3,193,883
MANDREL FOR SHAPING SOLID PROPELLANT ROCKET
FUEL INTO A MOTOR CASING
Filed Sept. 7, 1960   2 Sheets-Sheet 1

INVENTORS
JOSEPH G. THIBODAUX, JR.
DONALD J. LEWIS

BY

ATTORNEYS

July 13, 1965   J. G. THIBODAUX, JR., ETAL   3,193,883
MANDREL FOR SHAPING SOLID PROPELLANT ROCKET
FUEL INTO A MOTOR CASING
Filed Sept. 7, 1960   2 Sheets-Sheet 2

INVENTORS
JOSEPH G. THIBODAUX, JR.
DONALD J. LEWIS

BY

ATTORNEYS

United States Patent Office 3,193,883
Patented July 13, 1965

3,193,883
MANDREL FOR SHAPING SOLID PROPELLANT ROCKET FUEL INTO A MOTOR CASING
Joseph G. Thibodaux, Jr., Newport News, and Donald J. Lewis, Hampton, Va., assignors to the United States of America as represented by the Administrator of the National Aeronautics and Space Administration
Filed Sept. 7, 1960, Ser. No. 54,552
4 Claims. (Cl. 18—39)
(Granted under Title 35, U.S. Code (1952), sec. 266)

The invention described herein may be manufactured and used by or for the Government of the United States of America for governmental purposes without the payment of any royalties thereon or therefor.

The invention relates generally to a solid propellant rocket motor, and more particularly to a solid fuel rocket motor having a specific concavity formed within the fuel charge; and further relates to a method and an apparatus for making same.

One prior art method of making solid propellant rocket motors involves pouring a solidifiable propellant into a motor casing and completely filling the concavity therein. On ignition of this type of motor, however, the propellant burns forwardly along a single plane having a somewhat limited burning surface area. It was found that making the burning surface of the propellant larger results in greater thrust developed by the motor during operation. Consequently, concavities were formed in the fuel charge to provide a larger propellant burning surface in these motors. Another prior art method of making solid propellant motors having this desired burning surface configuration formed in the propellant comprises precasting the propellant as quadrantal members or in rectangular bars which are positioned and assembled within a motor casing. This method of making solid fuel motors is not considered completely satisfactory, however, due to the excessive costs of the considerable amount of skilled hand work required to form the precast elements and position them within a motor casing. Furthermore, due to the human factor involved, these prior art motors have a variability in performance characteristics and are generally unreliable.

Still another prior art method of forming a concavity in the fuel charge of a solid propellant motor involves casting the propellant into a motor casing having a mandrel positioned therein. After the castable propellant has cured, the mandrel is removed therefrom either by extraction through the motor nozzle aperture, or by disassembly of the motor casing. This method of production has likewise proved to be undesirable, due to the fact that the diameter of the charge concavity is of necessity limited by the size of the motor exhaust nozzle aperture, thereby limiting the propellant burning surface area of the motors. Further, disassembly of the motor casing disturbs and causes cracks in the formed charge, which during firing causes the motor to exhibit uneven linear thrust resulting from combustion within these cracks. It is therefore considered desirable to provide a method of making solid propellant rocket motors which have fuel charge concavities formed therein providing a larger propellant burning surface area than obtainable with prior art methods and which may be utilized in forming any desired configuration or design.

Accordingly, it is an object of the present invention to provide a new and improved mandrel for shaping solid propellant rocket fuel charges in a solid propellant rocket motor casing.

Still another object of the present invention is to provide a mandrel for producing a solid propellant rocket motor with a shaped full charge concavity providing a large propellant burning surface.

Generally speaking, the foregoing objects, as well as others, are accomplished in accordance with this invention by providing, in a rocket motor, a rocket motor casing having a nozzle aperture, said mandrel greater in diameter when assembled than the rocket motor casing aperture assembled within a rocket motor casing, the cast propellant filling the concavity formed by the motor casing and mandrel, the mandrel being meltably removable from the motor casing after curing and solidification of the propellant without damage to the rocket motor casing and charge positioned therein.

A more complete understanding of the invention and many of the attendant advantages thereof will be readily apparent as the same becomes better understood by reference to the following detailed description when considered in connection with the accompanying drawings wherein.

Figure 1:
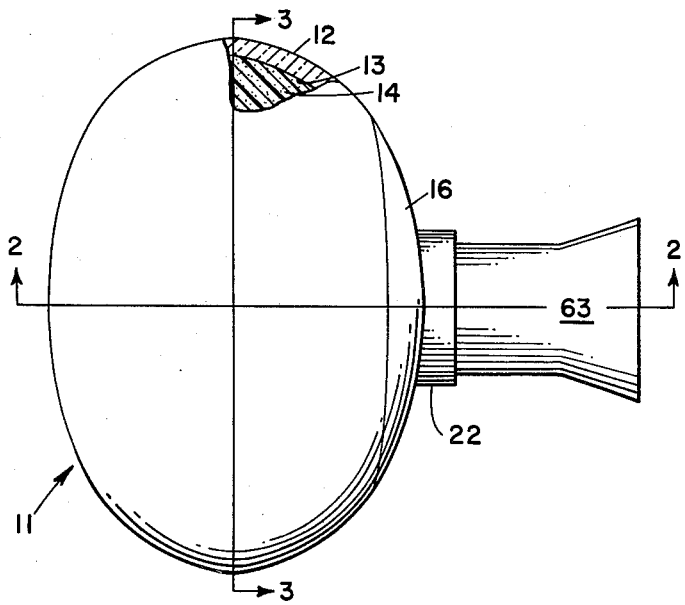
FIG. 1 is a side view of the assembled motor, with parts broken away to show the internal casing structure.

Referring now to the drawings, wherein like reference numerals designate identical or corresponding parts throughout the several views, and more particularly to FIG. 1, a rocket motor, generally indicated by the reference numeral 11, is shown as comprising a spheroidal motor casing 12 having a concavity 13 defined by the interior surface of casing 12. A cast solid propellant 14 such, for example, as Thiokol T-21, or the like, is disposed in motor 11 filling concavity 13. Casing 12 is preferably formed of wrapped Fiberglas filaments conventionally molded into an oblate spheroidal shell with a binder such, for example, as acrylic resin or the like. Casing 12 has an aperture 15 formed in one side thereof, as more clearly shown on FIG. 2, preferably on an axis perpendicular with the largest diametrical plane thereof. An annular member 16 is rigidly positioned on casing 12 surrounding aperture 15 by integrally connected flange portions 17 and 18. Portions 17 and 18 extend anteriorly from member 16 and extend over the peripheral edge of aperture 15 and the adjoining exterior and interior edge portions thereof, respectively. Member 16 also has a cylindrical projection 19 integrally connected posteriorly thereto on an axis perpendicular to the largest diameter of casing 12, as hereinbefore noted, having screw threads 21 formed exteriorly therein. A cylindrical member 22 has screw threads 23 formed interiorly in one end thereof for threadable interconnection with threads 21. Member 22 likewise has screw threads 24 formed interiorly in the other end thereof of a reduced diameter thereby forming an annular shoulder 25 at approximately the longitudinal midpoint thereof.

Figure 2:
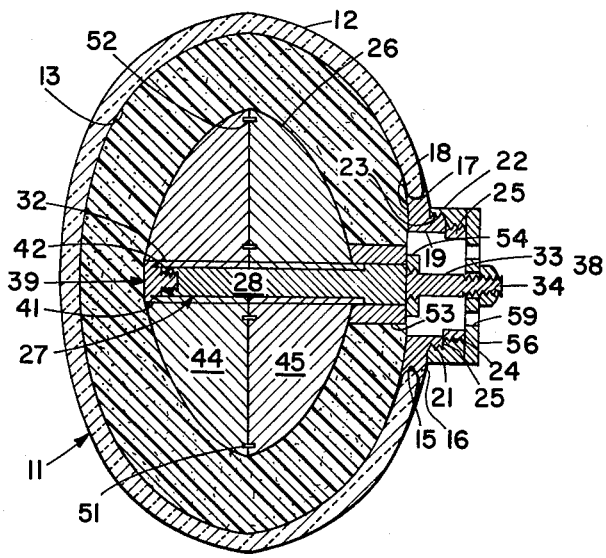
FIG. 2 is a cross-sectional view of the motor taken along line 2—2 of FIG. 1 and showing the mandrel positioned therein.
Figure 3:
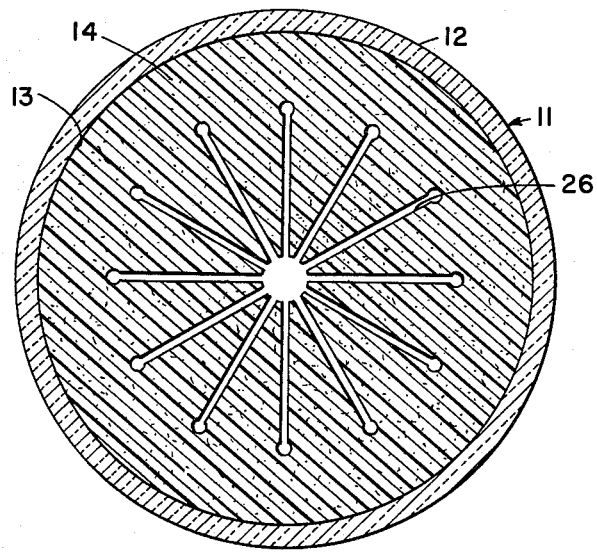
FIG. 3 is a cross-sectional view of the assembled motor taken along line 3—3 of FIG. 1.
Figure 4:
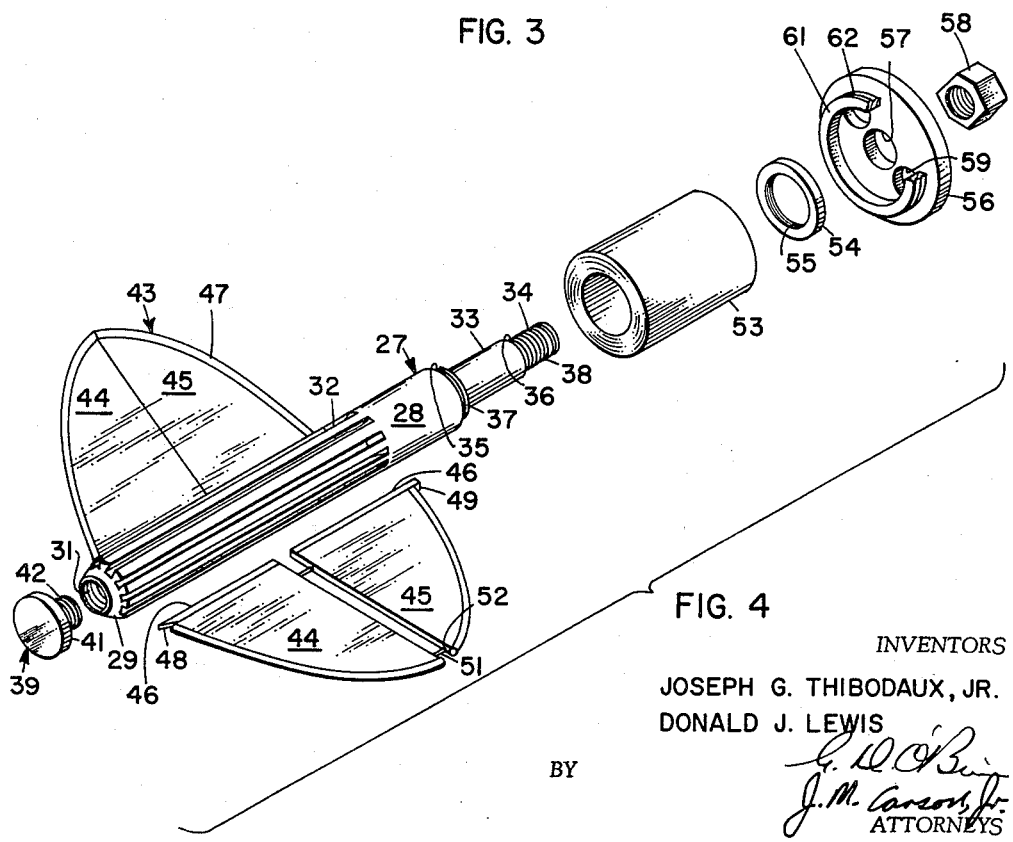
FIG. 4 is an isometric exploded view of the mandrel.

Solid propellant 14 disposed within concavity 13 may have axially formed radial concavities (note FIG. 3), all of which is designated by concavity 26 formed therein by mandrel 27 during propellant casting, as more clearly shown in FIGS. 2 and 3. Concavity 26 provides an increased surface burning area for the solid charge thereby providing superior operating characteristics for rocket motor 11. The structural details of concavity forming mandrel 27 are more clearly shown in FIGS. 2 and 4. Mandrel 27 includes a cylindrical center body section 28, preferably formed of aluminum or the like. Section 28 is provided with a tapered anterior end portion 29 with a tap hole 31 formed axially therein. A plurality of equidistantly spaced grooves 32 shaped like the mortise of a mortise and tenon type joint are formed in section 28. Grooves 32 are formed radially and longitudinally in section 28 and extend from anterior end portion 29 a distance greater than one-half the length thereof. Section 28 also includes successively reduced diametrical portions 33 and 34 forming shoulder portions 35 and 36, respectively, thereon. Portion 33 has external screw threads 37 formed thereon adjacent shoulder 35. Portion 34 has external screw threads 38 formed therein from shoulder 35 outwardly, providing a shanked end portion.

A bolt 39 having a head portion 41 with a flush upper surface, a projecting peripheral edge, and a shank portion 42 externally screw threaded corresponding with tape hole 31 is rigidly interconnected therewith. A plurality of flat substantially semidiscoidal members 43 are slidably connected by grooves 31 to member 27, defining a mandrel greater in diameter than the diameter of motor casing aperture 15. Semidiscoidal members 43 may be formed into one or more oppositely disposed pairs as desired in order to control the amount of increased surface burning area to be exposed. Each member 43 is formed in two parts constituted by an anterior quadrantal element 44 and a posterior quadrantal element 45, by any suitable conventional molding operation from a suitable eutectic material, such, for example, as Cerrobend or the like. Elements 44 and 45 each have a rib portion 46, shaped like a tenon and capable of forming a mortise and tenon type joint with groove 32, positioned centrally along the edge thereof abutting section 28. Member 43 also has a peripheral bead 47 formed thereon which extends around the curved peripheral edge thereof and has a diameter somewhat greater than the thickness of elements 44 and 45. Element 44 includes a notch or indentation 48 formed in the anterior end portion of rib portion 46 capable of engaging the peripheral edge of portion 41 of bolt 39. Element 45 is provided with a projection 49 formed on the posterior side thereof by rib portion 46 extending outwardly from the peripheral edge thereof. A rod 51 having a diameter less than the thickness of member 43 is seated in one of the elements 44 and 45 in the abutting edge thereof. Rods 51 are positioned at diametrically opposite ends of the elemental abutting edge and an aligned bore 52 is formed in the other elemental abutting edge to receive each rod 51 thereby rigidly aligning elements 44 and 45. An annular sleeve 53 having a bore formed thereon is positioned about section 28, the anterior end thereof extending over projections 49. Sleeve 53 is securely disposed about section 28 by annular member 54 having screw threads 55 formed internally therein and threadedly engaging screw threads 37.

During molding, mandrel 27 is axially centered within concavity 13 by a cylindrical centering device 56. A bore 57 is formed in device 56 on an axis perpendicular to the largest diameter of casing 12, as hereinbefore noted, and portion 34 of section 28 is inserted therethrough and nut 58 is screwed down tight thereagainst, securing device 56 to mandrel 27. Apertures 59 are formed in device 56 parallel to and on diametrically opposed sides of bore 57. Propellant 14 is introduced into concavity 13 by passage through apertures 59. A cylindrical projection 61 is integrally connected to device 56 on the interior side thereof and concentrically positioned with respect to the hereinbefore mentioned axis perpendicular to the greatest diameter of casing 12. External screw threads 62 are formed in projection 61 and engage correspondingly with screw threads 24, rigidly securing mandrel 27 within casing 12.

During casting of the propellant, casing 12 preferably is positioned so that aperture 15 is vertically positioned with the horizontal. After propellant 14 has solidified and cured, mandrel 27 is removed from motor 11 by melting, as more fully explained hereinafter, thereby forming at least one radial cavity within the propellant charge having a propellant burning surface with a larger area than casing 12. After mandrel 27 is removed from motor 11, frusto-conical exhaust nozzle 63 having external screw threads, not shown, formed in the smallest end thereof is threadedly connected to motor 11 by screw threads 24. Motor 11 is then readied for operation by conventional methods for preparing motors of this type for firing.

The method of making motor 11 may be apparent from the foregoing description; however, in order to more fully describe one of the preferred methods of producing the motor, the following description is believed to be helpful. Motor casing 12 may be formed by conventional methods of molding and shaping Fiberglas, as pointed out hereinbefore. Annular member 16 preferably is positioned about aperture 15 of casing 12 during molding. Mandrel 27 is positioned within casing 12 by inserting the component parts thereof into concavity 13 through aperture 15, assembly thereof within concavity 13, as hereinbefore described, and rigidly positioning mandrel 27 in motor 11. Propellant 14 is cast into concavity 13 through apertures 59 and cured by maintaining motor 11 at a temperature of approximately 140° F. to 150° F. for about four days. After propellant 14 has cured and solidified, motor 11 is heated to a temperature of approximately 160° F. to 165° F., thereby causing melting of members 43 of mandrel 27. Section 28, along with interconnecting bolt 39, sleeve 53, member 54, device 56 and nut 58, is removed from motor 11 by lifting therefrom through aperture 15 at this temperature without damage to the propellant charge. Molten members 43 are removed from motor 11 while molten by tilting motor 11 and pouring the molten material thereof through aperture 15. To insure complete removal of members 43 from motor 11, each concavity as at 26 is rinsed with mercury which forms an amalgam for dissolving any residual Cerrobend.

It will be readily apparent to those skilled in the art that cavities may be formed in solid propellant fuel charges having any desired configuration.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A combination solid propellant rocket motor casing and mandrel for forming shaped concavities therein, comprising: a unitary rocket motor casing having an aperture substantially smaller than the largest dimension of the casing; mandrel means comprising a center section and a plurality of two-part discoidal members detachably mounted on said center section said two-part discoidal members being small enough when disassembled from said center section to pass through said aperture; means for thereafter attaching said two-part discoidal members to said center section to form said mandrel structure substantially larger than said aperture and means for positioning said mandrel axially within a motor casing.

2. A combination solid propellant rocket motor casing and mandrel for forming shaped concavities within fuel charges of cast solid-propellant disposed therein, comprising: a unitary rocket motor casing having an aperture substantially smaller than the largest dimension of the casing; mandrel means comprising an elongated center section incorporating an axially disposed tap opening, a plurality of equidistantly spaced, mortise-like grooves formed in said center section and a plurality of two-part discoidal members detachably mounted on said center section, each of said discoidal members having tenon-like rib element means formed on an edge portion thereof in abutting relation to said center section for slidable positioning in a respective mortise-like grooved portion thereof; said two-part discoidal members being small enough when disassembled from said elongated center section to pass through said discharge opening; means for thereafter retaining each of said discoidal elements in assembled condition to said center section and facilitating the disassembly thereof comprising a bolt element in threaded engagement with the tap opening said bolt having a portion in locking contact with the rib of each of said discoidal elements retaining the latter attached to said center section, said mandrel after assembly within said casting forming a structure substantially larger than said aperture; and means for positioning and maintaining said mandrel axially centered within the motor casing.

3. A combination solid propellant rocket motor casing and mandrel for forming shaped concavities within fuel charges of cast solid propellant disposed therein; comprising: a one piece rocket motor casing having an aperture substantially smaller than the largest dimension of the casing; mandrel means, said mandrel comprising a center section incorporating a plurality of relatively elongated grooves on the circumference thereof and at least one pair of oppositely disposed discoidal elements slidably positioned in a respective pair of said center section grooves and incorporating notched end portions, said two part discoidal members being small enough when disassembled from said center section to pass through said aperture; releasably positioned locking means for engaging said two part discoidal members and said center section after assembly in said casing and adjustable to a fully seated positon in contact with the notched end portion of each of said pair of discoidal elements retaining the latter in mounted condition with the respective center section grooves, said mandrel within said casing forming a structure substantially larger than said aperture; and means releasably attached to an end portion of said center section centering said mandrel within the motor casing.

4. A combination solid propellant rocket motor casing and mandrel for forming shaped concavities therein as in claim 3 wherein said last-named means comprises a cylindrical cap element incorporating a cylindrical projection threadedly engaged with the motor casing and incorporating an axially disposed relatively reduced central opening for receiving one end of said center section; and a pair of apertured portions through which the fuel charge propellant is received.

References Cited by the Examiner
UNITED STATES PATENTS

| | | | |
|---|---|---|---|
| 2,203,421 | 6/40 | Stevenson et al. | 18—58 |
| 2,405,329 | 8/46 | Ruebensaal | 18—58 |
| 2,890,490 | 6/59 | Morin | 18—45 |
| 2,961,708 | 11/60 | Morin | 18—45 |
| 3,001,363 | 9/61 | Thibodaux et al. | 102—49 |

WILLIAM J. STEPHENSON, *Primary Examiner.*
SAMUEL FEINBERG, CARL D. QUARFORTH,
*Examiners.*